United States Patent [19]

Schleip et al.

[11] Patent Number: 5,060,415
[45] Date of Patent: Oct. 29, 1991

[54] HOT BED ENCLOSURE

[76] Inventors: Ernest G. Schleip; Bruce E. Schleip, both of 380 N. 2d St., Box 148, Springfield, Nebr. 68059

[21] Appl. No.: 667,103

[22] Filed: Mar. 11, 1991

Related U.S. Application Data

[63] Continuation of Ser. No. 195,886, May 19, 1988, abandoned.

[51] Int. Cl.$^5$ .............................................. A01G 13/04
[52] U.S. Cl. ............................................ 47/19; 47/29
[58] Field of Search ................. 47/17, 19, 26, 28.1, 47/29, 31, 32, 68

[56] References Cited

FOREIGN PATENT DOCUMENTS

| | | | |
|---|---|---|---|
| 451077 | 6/1927 | Fed. Rep. of Germany | 47/19 |
| 553116 | 9/1930 | Fed. Rep. of Germany | 47/19 |
| 429776 | 9/1911 | France | 47/19 |
| 627438 | 10/1927 | France | 47/19 |
| 813882 | 6/1937 | France | 47/19 |
| 822134 | 12/1937 | France | 47/19 |
| 1311803 | 11/1962 | France | 47/29 |
| 269618 | 6/1964 | Netherlands | 47/19 |
| 341022 | 10/1959 | Switzerland | 47/19 |
| 582859 | 11/1946 | United Kingdom | 47/29 |
| 602541 | 5/1948 | United Kingdom | 47/19 |
| 866245 | 4/1961 | United Kingdom | 47/29 |
| 1241256 | 8/1971 | United Kingdom | 47/29 |

Primary Examiner—Danton D. DeMille
Attorney, Agent, or Firm—John A. Beehner

[57] ABSTRACT

A hot bed enclosure for starting new plants includes a pair of generally upright and longitudinally spaced apart transparent end walls together with a top cross bar and a pair of bottom rails connected to and extended between them to provide a structural framework for the enclosure. The top cross bar and bottom rails are secured to the end walls by readily detachable fasteners such as hinges with removable hinge pins. The open top of the enclosure is closable with a pair of transparent doors pivotedly mounted on the top cross bar. When closed, the doors are preferably disposed at a 42° angle to the ground and the enclosure is preferably positioned with the opposite end walls facing north and south. When not needed, the enclosure is readily broken down for compact storage.

4 Claims, 3 Drawing Sheets

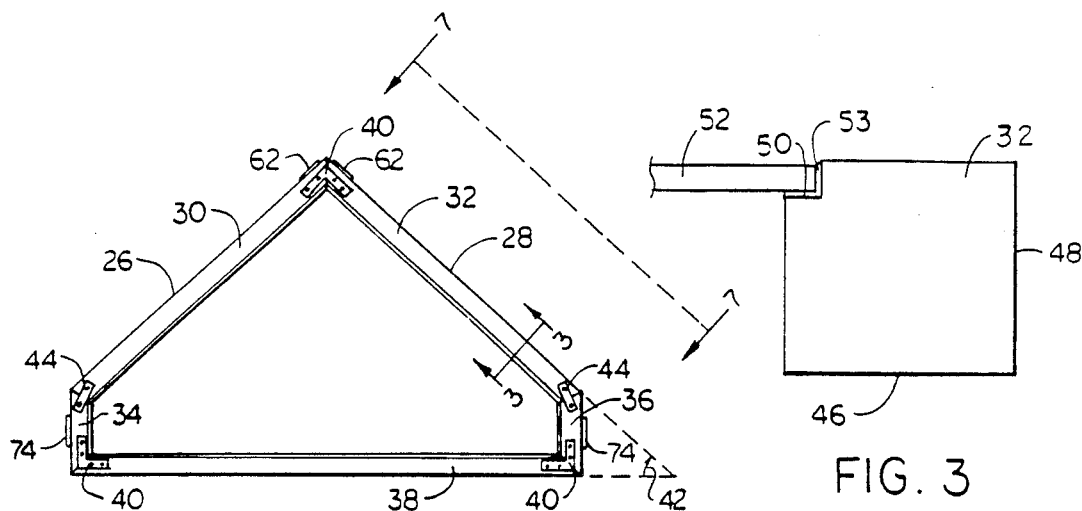
FIG. 2
FIG. 3
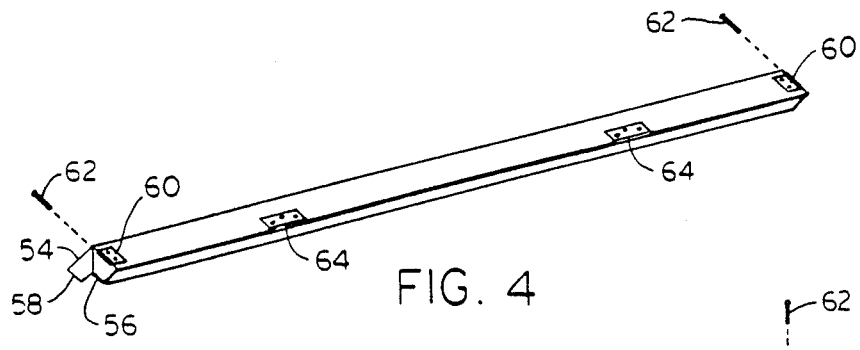
FIG. 4
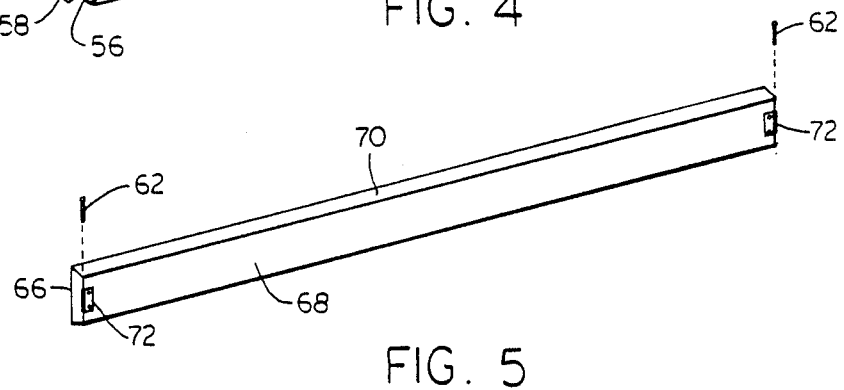
FIG. 5

HOT BED ENCLOSURE

CROSS REFERENCE TO RELATED APPLICATION

This is a continuation of patent application Ser. No. 195,886 filed on May 19, 1988 now abandoned.

BACKGROUND OF THE INVENTION

The present invention is directed generally to hot bed enclosures for starting new plants and more particularly to a hot bed enclosure designed for improved light and heat reception and retention, with mechanically adjustable ventilation and the capability of being quickly and easily disassembled for compact storage.

Starting a garden by purchasing nursery plants is prohibitively expensive for many people and certainly not cost efficient for a large garden. The alternative is for the gardener to construct a hot bed enclosure for starting his or her own plants Three elements are needed for plant growth, namely sun, heat to incubate the starting root systems and soil. Accordingly, a hot bed enclosure is typically an open bottomed structure having transparent wall portions to allow sunlight to enter. Permanent structures are unacceptable to the small gardener who doesn't have space to give up year round for such an enclosure which may only be used in the spring. Other hot bed enclosures are so bulky and cumbersome that set-up, disassembly and storage are constant problems. Finally, other hot bed enclosures have only limited solar exposure and require expensive electronic temperature sensors and motors for internal temperature control.

Accordingly, a primary object of the invention is to provide an improved hot bed enclosure.

Another object is to provide a hot bed enclosure having large transparent panels in both the top walls and end walls for maximum solar exposure.

Another object of the invention is to provide a hot bed enclosure having large transparent top panels which are designed to be supported at approximately forty two degrees relative to horizontal for efficient reception and retention of light and radiant heat.

Another object of the invention is to provide a hot bed enclosure including certain limited ventilation openings for assuring some ventilation for the plants in the hot box even when the pivotal top panels are closed.

Another object of the invention is to provide a hot bed enclosure which can be quickly and easily disassembled for compact transport and storage, yet which is structurally sound when assembled to assure dependable use over many growing seasons.

Finally, an object of the invention is to provide a hot bed enclosure which is simple and rugged in construction, inexpensive to manufacture and efficient in operation.

SUMMARY OF THE INVENTION

The hot bed enclosure of the invention includes a pair generally upright and longitudinally spaced apart transparent end walls having a top cross bar and a pair of bottom rails connected to and extended between them to provide the structural framework for the enclosure. The top cross bar and bottom rails are secured to the end walls by readily detachable fasteners such as hinges with removable hinge pins. The end walls are substantially triangular with upwardly converging top edges and truncated lower corners to facilitate connection to the bottom rails. A pair of substantially transparent top panels are provided which are of a size and shape to substantially cover and close the area between the opposite top edges of the end walls. These top panels are hingedly connected at their upper ends for pivotal movement between closed and open positions for varying ventilation to the enclosure and for providing access to the young plants within the enclosure. Limited ventilation openings around the top panels assure minimal ventilation even when the top panels are fully closed, thereby to dissipate excessive heat which could otherwise destroy the young plants.

Assembly and disassembly simply requires the insertion and removal of the hinge pins for detachably connecting the four panels and three rails of the enclosure. The disassembled panels and rails are easily stored in a small space until they are again needed for the next growing season.

The approximate forty two degree angle of the top panels in their closed positions bends light down to the new plants for most efficient heat reception and retention. That inclination also affords good drainage of rain water from the structure to avoid standing water that could damage the enclosure over time.

The low bottom rails and bottom struts of the end walls cast little or no shadows so as to afford maximum solar exposure even when the sun is low in the sky.

BRIEF DESCRIPTION OF THE DRAWINGS

FIG. 2 is an end view of the hot bed enclosure;

FIG. 3 is an enlarged partial sectional view taken along line 3—3 in FIG. 2;

FIG. 4 is a perspective view of the elongated top cross bar of the enclosure;

FIG. 5 is a perspective view of an elongated bottom rail of the enclosure;

DESCRIPTION OF THE PREFERRED EMBODIMENT

Figure 1:
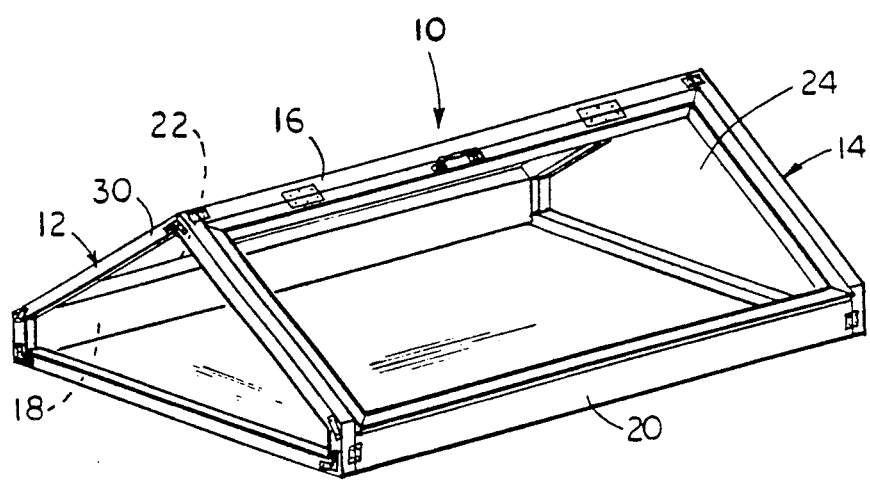
FIG. 1 is a perspective view of the hot bed enclosure of the invention.

The hot bed enclosure 10 of the present invention is readily assembled from a number of separate parts including a pair of generally upright, transversely extended and longitudinally spaced apart end walls 12 and 14, a top cross bar 16, a pair of bottom rails 18 and 20 and the pair of hinged doors or top panels 22 and 24. The end walls 12 and 14 and top panels 22 and 24 are preferably framed transparent panels of glass or plastic for substantially maximum reception and retention of heat and light. The top panels 22 and 24 are hinged at their upper edges so that they can be pivoted upwardly to provide increased ventilation and/or access to the new plants being incubated in the enclosure.

End walls 12 and 14 are identical to one another. Accordingly, like reference numerals are used to refer to like parts of each. In FIG. 2, it is seen that end wall 12 is substantially triangular in shape with slightly truncated lower corners so as to define upwardly converging top edges 26 and 28. Each end wall is preferably constructed with a pair of inclined upper struts 30 and 32, short upright side struts 34 and 36 and an elongated horizontal bottom strut 38. The adjoining ends of bottom strut 38 and side struts 34 and 36 are cut at 45° angles to effect a 90° mitered joint. The adjoining surfaces are glued together; a pair of eight penny nails are driven through the end of each strut into the other and a two inch corner bracket 40 is secured over the exterior face of the joint. Likewise, the adjoining ends of side struts 34 and 36 upper struts 30 and 32 are cut at equal angles to effect a 42° inclination of the upper struts 30 and 32 as indicated by arrow 42 in FIG. 2. A vertical miter joint is provided between the upper ends of the upper struts 30 and 32. All three of the last described joints are secured by glue, nails and either the two inch straight brackets 44 or the corner bracket 40.

The boards of end walls 12 and 14, in the preferred embodiment, measure 1 and ⅝ inches across the interior face 46 and 1 and ½ inches deep at outer edge 48 with ¼ inch by ¼ inch channel 50 formed in the inner exterior corner of the board for receiving a fitted 3/16 inch glass panel 52. Glass Panel 52 may be retained by the end wall struts by applying a silicone seal 52 to the channel, which seal makes the glass adhere to the struts, thereby forming a unified framed panel and strengthening the same.

The top cross bar 16 is illustrated in FIG. 4 as including an inverted generally V-shaped strip having an exterior width of 2 and ¾ inches at 54 and an interior width of 1 and ½ inches at 56. These boards are likewise 1 and ½ inches thick at 58 and extend for a length of 5 feet and ⅛ inch. Two hinge halves 60 are secured at each end of the top cross bar 16 for connection to matching aligned hinge halves 62 on the top edges of the end walls 12 and 14. The connection is made by inserting a removable hinge pin 62 through the aligned halves. An additional pair of larger 3 inch hinge halves 64 are secured on each of the inclined top surfaces of top cross bar 16 in spaced apart relation as shown in FIG. 4 for detachable securement to the top panels 22 and 24 as described below.

The bottom rails 18 and 20 are also identical to one another so like reference numerals are used to refer to like parts of each. The bottom rail 18 shown in FIG. 5 is formed from 1×6 lumber and has a 4 and ½ high interior face 66, a 3 and ⅞ inch tall exterior face 68 and a top surface 70 inclined 42° relative to horizontal. A pair of 2" hinge halves 72 are secured to opposite ends of the bottom rails 18 and 20 for detachable connection to the matching aligned hinge halves 74 on the side struts 34 and 36 of the end walls 12 and 14, as shown in FIG. 2. Those connections are made by the removable hinge pins 62.

Figure 7:
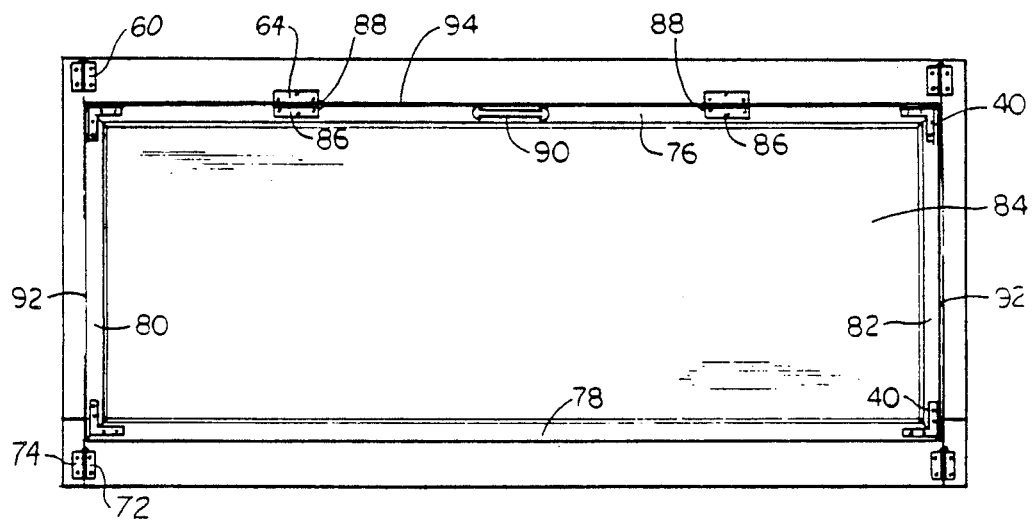
FIG. 7 is a plan view of a top panel as installed on the enclosure.

The top panels or doors 22 and 24 are likewise identical to one another so like reference numerals are used to refer to like parts of each. Door 24 is shown in FIG. 7 as including a rectangular frame made of top and bottom struts 76 and 78 and upright side struts 80 and 82. Each of these struts has a cross sectional shape and dimensions as described in connection with FIG. 3. A large transparent panel 84 of glass, plastic or the like is set within the channels and secured therein with silicone seal or by any other suitable means. The corners of the top panel frames include 45° mitered joints which are preferably glued, nailed and reinforced with 2 inch corner brackets 40. The exterior dimensions of the top panels 22 and 24 are 5 feet long by 25 and ½ inches wide. Top strut 76 has a pair of 3 inch hinge halves 86 secured thereto at positions aligned with the hinge halves 64 on top cross bar 16 for a detachable connection thereto with removable hinge pins 88. A handle 90 is preferably mounted on the exterior surface of top strut 76 to facilitate handling of the top panel upon removal from the enclosure.

Figure 6:
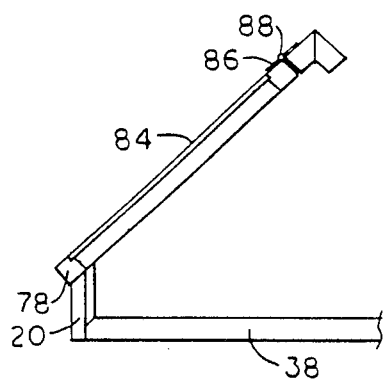
FIG. 6 is an enlarged partial side sectional view of the hot bed enclosure.

Since the length of the top cross bar 16 exceeds the length of the top panels by a small dimension such as ⅛th inch in the illustrated embodiment, a 1/16 inch gap is formed between the top panel and end walls along the full length of the juntion between them. In addition, the large hinge halves 64 and 86 on the top cross bar 16 and top panels 22 and 24 may be so positioned relative to their respective members that another approximately 1/16th inch gap 94 is formed between the top of the top panel and top cross bar when the top panel is pivoted to the closed postiion shown in FIGS. 6 and 7 wherein the bottom strut 78 of the door rests flush against the inclined top surface of the associated bottom rail 18 or 20. The gaps 92 and 94 are important for providing limited ventilation between the interior of the enclosure and the ambient atmosphere when the top panels are closed, thereby to prevent excessive heat buildup within the enclosure. Temperatures on the order of 350° F. could build up within the enclosure in the absence of gaps 92 and 94 or equivalent ventilation openings.

Figure 8:
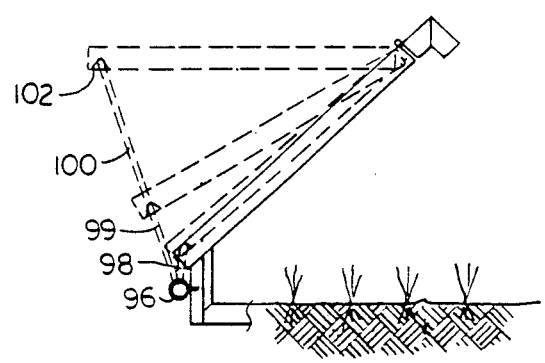
FIG. 8 is an enlarged partial side sectional view showing the pivoted postions of the top panel and plants growing within the enclosure.

Referring to FIG. 8, it is desirable to provide means for supporting the top panels at various selected positions above the solid line closed position, either for increased ventilation or access to the plants in the enclosure. One simple mechanical way of supporting the top panels is to provide an eyebolt 96 at each end of bottom rails 18 and 20 with each eyebolt having three support rods 98, 99 and 100 pivotally connected to it for insertion into aligned sockets in the underside of the top panel bottom struts 78, as illustrated at 102. The preferred support positions include one and six inch spacings of the top panel bottom strut from the bottom rails and a horizontal position for the top panels. Such support for the top panels could alternately be provided by spring loaded hinges, pneumatic cylinders or by any other suitable means.

The specific materials used for construction of the enclosure are not critical to the invention but the following have been found to be suitable. The wood struts may be constructed either of a Western red cedar or an aeromatic cedar from Kentucky. It is preferred that the struts be treated with a commercially available water seal treatment such as that sold under the Thompson brand. A redwood stain may be added for a pleasing natural appearance.

In operation, it is preferred that the assembled enclosure be sunk into the ground about 1 and ½ inches or the height of the end wall bottom struts to thereby form a seal with the ground and prevent heat loss.

The soil itself may be specially prepared by forming the top foot of soil as a mixture of approximately 50% dirt from the site, with the remaining 50% comprising sand and a commercially available peat lite mix such as that sold under the Terra-lite brand. A shoreline sand has been found to be most preferable. The sand acts to prevent crusting of the soil.

For vegetables such as broccoli, cauliflower and cabbage which only need heat to get started, the top panels can be soon raised and removed. Slower growing plants such as tomatoes however do best with the top panels closed for a considerably longer period of time. The closed top panels result in higher temperatures, and condensation within the enclosure which provides moisture for the starting plants.

Whereas the invention has been shown and described in connection with a preferred embodiment thereof, it is apparent that many modifications, additions and substitutions may be made which are within the intended broad scope of the appended claims. For example, the various end and top panels need not be framed if the panel material itself can accommodate the hardware or structure for connection to the other members of the enclosure. Even the framed walls or panels need not be made of wood as high density plastics having suitable structural characteristics are believed to be available as well. Whereas the number and arrangement of the securement hinges is not critical to the invention, the illustrated hinges afford strong and efficient connections and support.

It may be preferred to use 2 and ½ inch corner brackets 40 for added strength. The bottom rails 18 and 20 measure 5 feet ⅛ inch, the same length as top cross bar 16 to assure a uniform width for the gaps 92. The top cross bar and bottom rails may be of any preferred length but it is preferred that they be of equal length. The overall height of the illustrated embodiment is 23 and ⅜ inches from the bottom edge of end wall 12 to the top apex thereof. Whereas various props are described for supporting the hinged doors or top panels at selected raised positions, this could also be accomplished simply by propping the doors up with separate sticks or boards having their lower ends in ground engagement.

Options that may be desirable for use in connection with the hot bed enclosure of the invention include a fitted cover of canvas or the like for heat retention in the event a cold ambient conditions. Likewise, the ground within the enclosure can be kept from freezing by hanging heating lamps from the top cross bar or by running a series of heating cables through the ground within the enclosure.

Thus there has been shown and described a hot bed enclosure which accomplishes a least all of the stated objects.

We claim:

1. An elongated open bottomed hot bed enclosure for starting new plants, comprising, an elongated longitudinally extended top cross bar, a pair of generally upright, transversely extended and longitudinally spaced apart end walls having upwardly converging top edges, a substantial portion of the area of said end walls being substantially translucent, said top cross bar being connected to and extended between upper portions of said end walls, a pair of bottom rails connected to and extended between transversely spaced apart lower portions of said end walls, detachable fastening means for connecting said top cross bar and bottom rails to said end walls, said detachable fastening means comprising a plurality of hinges having removable hinge pins, a pair of top panels, collectively of a size and shape to substantially cover and close the entire area between the opposite top edges of said end walls, a substantial portion of the area of said top panels being substantially translucent, means for detachably and pivotally supporting said top panels for pivotal movement about respective longitudinal pivot axis extended between upper portions of said end walls, each top panel being pivotally movable between a closed position where said top panel substantially covers and closes the area between opposite top edges of said end walls and an open position wherein the lower end of said top panel is situated in spaced relation above said top edges of the end walls thereby providing access to plants in said enclosure, said means for detachably supporting said top panels comprising a plurality of hinges, each having one half secured to said top cross bar and another half secured to said top panel and a removable hinge pin for pivotally joining said hinge halves, and said bottom rails stationarily fastened to said end walls whereby upward pivotal movement of the top panels opens a space between said top panels and said bottom rails, said enclosure including limited ventilation openings between the interior of said enclosure and the ambient atmosphere upon placement of said enclosure onto the ground and movement of said top panels to the closed positions thereof, said limited ventilation openings comprising elongated gaps between said top panels and end walls in the closed positions of said top panels, said top panels, in the closed positions thereof, being inclined at an angle of between 40° and 45° to horizontal.

2. The hot bed enclosure of claim 1 wherein said top panels, in the closed positions thereof, are inclined at an angle of substantially 42° to horizontal.

3. The hot bed enclosure of claim 1 wherein the width of said elongated gaps is between 1/32nd inch and ⅛th inch.

4. The hot bed enclosure of claim 1 further comprising means for supporting said top panels at selected open positions for varying the ventilation and access to plants in said enclosure.

* * * * *